(No Model.)
I. PIERCE.
METHOD OF PACKING VALVE STEMS.
No. 512,897.
Patented Jan. 16, 1894.
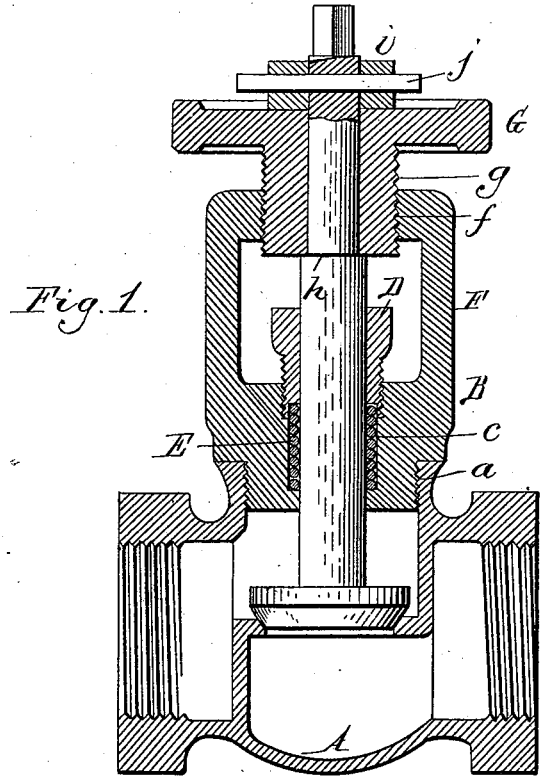
Fig. 1.
Fig. 2.
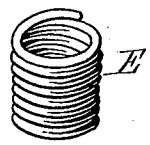
Witnesses:
F. Gustav Wilhelm.
Chas. F. Burkhardt.
Isaac Pierce    Inventor.
By Wilhelm Bonner
Attorneys.

UNITED STATES PATENT OFFICE.

ISAAC PIERCE, OF WEST BAY CITY, MICHIGAN.

METHOD OF PACKING VALVE-STEMS.

SPECIFICATION forming part of Letters Patent No. 512,897, dated January 16, 1894.

Application filed September 15, 1893. Serial No. 485,548. (No specimens.)

*To all whom it may concern:*

Be it known that I, ISAAC PIERCE, a citizen of the United States, residing at West Bay City, in the county of Bay and State of Michigan, have invented a new and useful Improvement in Methods of Packing Valve-Stems, of which the following is a specification.

My invention relates to an improvement in the method of packing valve stems and has the object to provide the stuffing box, through which the stem passes, with a packing which is permanent or lasting in its nature, so that the stem can be properly packed at the time and place of the manufacture of the valve and does not require to be repacked when the valve is required for use.

In the accompanying drawings:—Figure 1 is a vertical sectional view of a valve provided with my improved packing. Fig. 2 is a perspective view of the packing.

Like letters of reference refer to like parts in the several figures.

A represents the casing or body of a valve provided with the usual internal diaphragm in which the valve seat is arranged and having in its top the usual internally-threaded opening *a*.

B represents the cap which is screwed into the opening *a* of the casing and which contains the stuffing box *c*.

D is the gland of the stuffing box which is screwed into the internally-threaded box, and E is the packing.

F represents a yoke which is secured to and extends upwardly from the cap C and which is provided at its upper end with an internally-threaded opening *f*.

G is the hand wheel provided with an externally threaded shank *g* which works in the threaded opening *f* of the yoke and rests on a shoulder *h* formed on the stem. The latter passes loosely through the hand wheel and its threaded shank, and the wheel is held at the upper end of the stem by a washer *i* and pin *j*, so that the stem can turn in the wheel and shank, but is compelled to take part in the movements thereof toward and from the valve seat. The upper end of the stem is made square, or is otherwise so shaped that a tool can be applied to the same for turning the stem in order to grind the packing thereon and for grinding the valve to its seat after the valve has been screwed down. Any other suitable mechanism may, however, be employed for operating the valve.

The packing E, which is arranged in the stuffing box around the valve stem, is composed of a coil of wire of soft metal, for instance soft copper.

In packing the stem its flat sided end is inserted in the correspondingly shaped socket of a rapidly rotating shaft and the wire composing the packing is wound on the stem so as to form a cylindrical coil. After a sufficient length of wire has been wound on the stem, the coil is placed in the stuffing box and the gland is slowly screwed home while the stem is rotating. This compresses the coil in the stuffing box and causes the wire to fit snugly around the stem, and forms a ground joint between the packing and the stem, whereby a permanently tight packing is secured which permits of the necessary free movement of the valve stem without leakage and retains its efficiency for a long time, so that the valve stem can be properly packed at the time and place of the manufacture of the valve and does not require to be disturbed afterward.

Instead of forming the coil of soft metal wire by winding it upon the valve stem, it can be formed by winding it upon a mandrel, and can then be placed upon the valve stem, and ground on the same by rotating the valve stem and screwing the gland home at the same time, as above described.

I claim as my invention—

The herein described method of packing valve stems which consists in placing a coil of soft metal wire around the stem and into the stuffing box, and then rapidly rotating the stem and at the same time compressing the coil by moving the gland into the stuffing box, whereby a ground joint is formed between the wire coil and the stem, substantially as set forth.

Witness my hand this 25th day of August, 1893.

ISAAC PIERCE.

Witnesses:
LEE E. JOSLYN,
JAMES HODGSON PIERCE.